UNITED STATES PATENT OFFICE.

GEORGE WATT, SR., OF RICHMOND, VIRGINIA.

IMPROVEMENT IN HARROWS.

Specification forming part of Letters Patent No. 202,903, dated April 23, 1878; application filed March 2, 1878.

*To all whom it may concern:*

Be it known that I, GEORGE WATT, Sr., of Richmond, in the county of Henrico and State of Virginia, have invented a new and useful Improvement in Harrows; and I do hereby declare that the following is a full, clear, and exact description of the same.

The invention is an improvement in the class of flexible-harrows—that is to say, harrows composed of two or more parts or sections, which are hinged together, or otherwise so connected as to allow each section a certain degree of independent motion.

My improved harrow is formed of two flexible sections, which are connected and also held apart by bars which allow independent motion. Each section is composed of toothed transverse bars, connected by chains, the tension upon which, when the harrow is in use, serves to hold the teeth of the several bars at the proper angle to cause them to act on the soil in the required manner.

Figure 1:
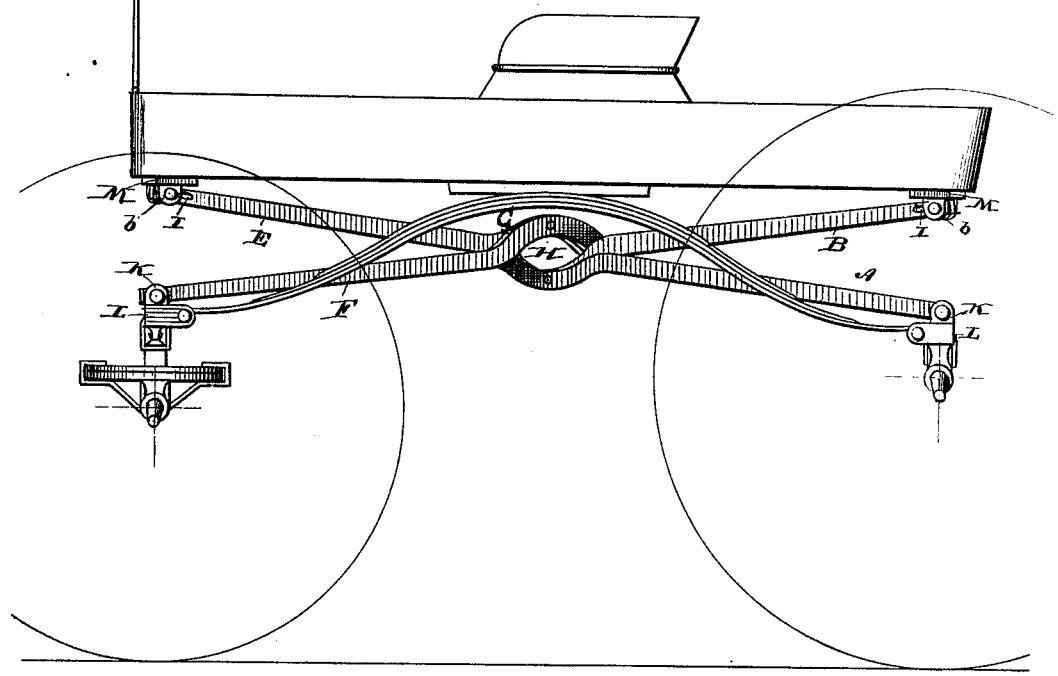
Figure 2:
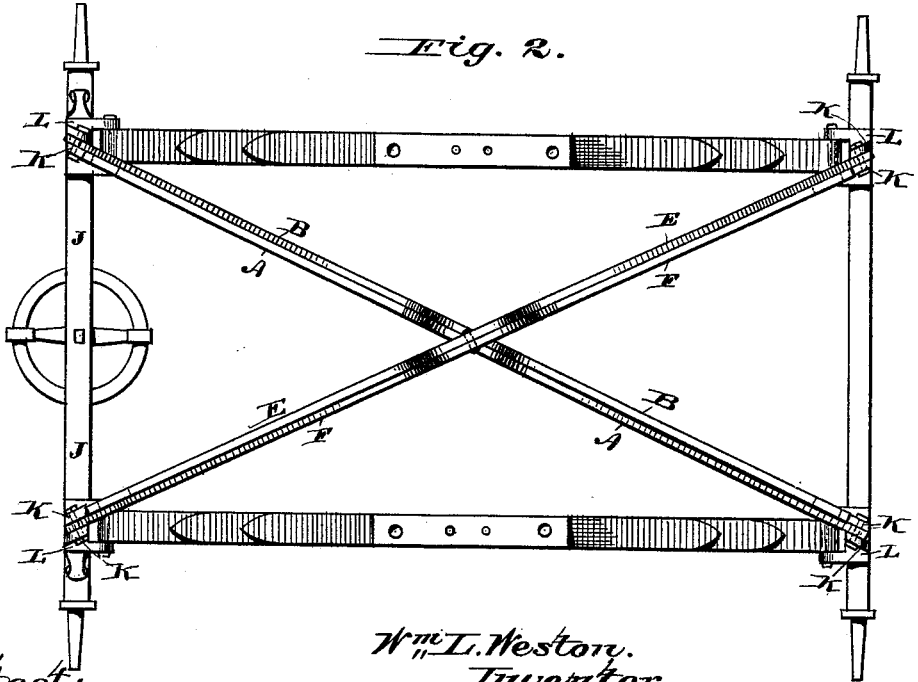

In the accompanying drawing, forming part of this specification, Figure 1 is a plan view of my improved harrow, and Fig. 2 is a cross-section on line $x\ x$ of Fig. 1.

A indicates the transverse parallel toothed bars of the harrow, and B the chains which connect them together by sections. The teeth are shown projecting about a third of their length above the upper side of the bars. The chains may pass through the several bars of each section, or be made in short lengths and attached to the sides of the contiguous bars.

The two sections are connected and also held apart by means of rigid bars C, which are attached at their respective ends to the chains B, that are nearest the contiguous inner ends of the bars A. These connecting-bars may be made of wood, in two parts, as shown in Fig. 2, and clamped upon the chains by means of screws $a\ a$ passing through both parts; or they may be made of metal, in one piece, having loops or slots formed in their ends to receive the chains.

The drag-chain D is attached at its respective ends to the rear bars of the toothed sections, and extends a considerable distance in rear of the harrow. An evener or double-tree, E, is attached by draft-chains F to the forward bars A of the toothed sections.

It is obvious that, in practical use, each of the harrow-sections has independent motion, except so far as limited by the connecting-bars C; and that each bar A has also independent motion, except as limited by its connecting-chain B. As the harrow is drawn forward, the teeth of the several bars A assume a greater or less inclination, according to the length they project from the under side of the bars. I have thus a perfectly flexible harrow, capable of operating upon any uneven surface, and which will pass easily over obstructions, such as sticks, stones, &c.

It will be seen that if the bars A are made narrow the teeth will assume a greater inclination than if they are made wide, owing to the difference in leverage; but I preferably secure this result by driving the teeth farther through the bars. For ordinary harrowing, as for preparing soil for reception of crops, the working portions of the teeth require to be short; but for harrowing in grass-seed, clover, &c., they should be as long as possible, in order that they may not enter the soil deeply; for, obviously, since the teeth act on the principle of a lever, the leverage will correspond to their length. Hence, the shorter the teeth the less will be their inclination, and, vice versa, the longer the teeth the greater will be their inclination to the plane of the harrow; and by so much as they approach a vertical position the deeper will they enter the soil, and the more they incline to the vertical the more they will work on or near the surface of the soil.

What I claim is—

1. The combination of the two separate flexible harrow-sections, each formed of a series of toothed bars, A, connected by chains B, and the rigid bars C, attached to the chains for connecting the said sections and holding them apart while allowing free or independent movement of each, all as shown and described.

2. In combination with the contiguous chains B B of the respective sections, the connecting-bars made in two parts clamped together and upon the chains, as shown and described.

GEORGE WATT, SR.

Witnesses:
MANFRED CALL,
R. A. WILLIAMS.

2 Sheets—Sheet 1.

W. L. WESTON.
Side-Spring Vehicle.

No. 202,904. Patented April 23, 1878.

Attest:
H. L. Perrine.
A. M. Long.

Wm L. Weston,
Inventor.
By H. T. Abbot, Attorney.